(12) United States Patent
Fei et al.

(10) Patent No.: US 11,134,514 B2
(45) Date of Patent: Sep. 28, 2021

(54) RANDOM ACCESS METHOD, NETWORK DEVICE, AND TERMINAL DEVICE

(71) Applicant: HUAWEI TECHNOLOGIES CO., LTD., Guangdong (CN)

(72) Inventors: Yongqiang Fei, Beijing (CN); Wei Sun, Shenzhen (CN); Xinqian Xie, Beijing (CN); Zhiheng Guo, Beijing (CN)

(73) Assignee: Huawei Technologies Co., Ltd., Guangdong (CN)

( * ) Notice: Subject to any disclaimer, the term of this patent is extended or adjusted under 35 U.S.C. 154(b) by 29 days.

(21) Appl. No.: 16/578,639

(22) Filed: Sep. 23, 2019

(65) Prior Publication Data
US 2020/0037355 A1    Jan. 30, 2020

Related U.S. Application Data

(63) Continuation of application No. PCT/CN2018/085358, filed on May 2, 2018.

(30) Foreign Application Priority Data

May 5, 2017    (CN) .......................... 201710314210.1
Sep. 30, 2017  (CN) .......................... 201710939568.3

(51) Int. Cl.
H04W 74/00      (2009.01)
H04W 48/10      (2009.01)
(Continued)

(52) U.S. Cl.
CPC ......... *H04W 74/004* (2013.01); *H04W 48/10* (2013.01); *H04W 52/242* (2013.01);
(Continued)

(58) Field of Classification Search
CPC ........... H04W 74/004; H04W 74/0833; H04W 74/0866; H04W 48/10; H04W 52/242; H04W 72/0453
See application file for complete search history.

(56) References Cited

U.S. PATENT DOCUMENTS

2004/0147263 A1* 7/2004 Schwarz ............... H04W 36/06
                                                    455/436
2010/0296467 A1   11/2010 Pelletier et al.
(Continued)

FOREIGN PATENT DOCUMENTS

CN    101466153 A    6/2009
CN    101778482 A    7/2010
(Continued)

OTHER PUBLICATIONS

Ericsson, "RLM and RLF in NR," 3GPP TSG-RAN WG2 #97, R2-1700868; Athens, Greece, Feb. 13-17, 2017, 4 pages.
(Continued)

*Primary Examiner* — Khai M Nguyen
(74) *Attorney, Agent, or Firm* — Fish & Richardson P.C.

(57) ABSTRACT

Example random access methods and apparatus are described. In one example method, a terminal device receives a system message that is sent by a network device on a first downlink carrier. The system message includes first information for performing random access on a first uplink carrier and second information for performing random access on a second uplink carrier. A frequency of the first uplink carrier is higher than a frequency of the second uplink carrier, and a frequency of the first downlink carrier is the same as the frequency of the first uplink carrier. The terminal device sends a random access request message on the first uplink carrier or on the second uplink carrier, and receives
(Continued)

a random access response message that is sent by the network device on the first downlink carrier.

15 Claims, 4 Drawing Sheets

(51) Int. Cl.
*H04W 52/24* (2009.01)
*H04W 72/04* (2009.01)
*H04W 74/08* (2009.01)

(52) U.S. Cl.
CPC ... *H04W 72/0453* (2013.01); *H04W 74/0833* (2013.01); *H04W 74/0866* (2013.01)

(56) References Cited

U.S. PATENT DOCUMENTS

| | | | |
|---|---|---|---|
| 2010/0329195 A1 | 12/2010 | Abraham et al. | |
| 2011/0286411 A1 | 11/2011 | Kim et al. | |
| 2016/0150571 A1* | 5/2016 | Pelletier | H04W 74/0833 370/329 |
| 2016/0183323 A1* | 6/2016 | Rahman | H04W 72/042 370/329 |
| 2016/0192394 A1* | 6/2016 | Ezaki | H04W 74/0833 370/329 |
| 2016/0330740 A1 | 11/2016 | Uchino et al. | |
| 2019/0261140 A1* | 8/2019 | Fujishiro | H04W 4/80 |
| 2019/0380078 A1* | 12/2019 | Fujishiro | H04W 48/20 |
| 2020/0037355 A1 | 1/2020 | Fei et al. | |

FOREIGN PATENT DOCUMENTS

| | | |
|---|---|---|
| CN | 101873711 A | 10/2010 |
| CN | 101969697 A | 2/2011 |
| CN | 104968054 A | 10/2015 |
| CN | 106416410 A | 2/2017 |
| CN | 108811155 B | 11/2019 |
| EP | 3101986 A1 | 12/2016 |
| WO | 2010047545 A2 | 4/2010 |

OTHER PUBLICATIONS

Huawei et al., "Transmission of data during random access procedure," 3GPP TSG RAN WG1 Meeting #88bis, R1-1705121; Spokane, USA, Apr. 3-7, 2017, 2 pages.
3GPP TS 38.321 V0.0.3 (May 2017), 3rd Generation Partnership Project; Technical Specification Group Radio Access Network; NR; Medium Access Control (MAC) protocol specification (Release 15), May 2017, 20 pages.
Samsung, "LTE text/principles for NR:Random Access," 3GPP TSG-RAN WG2 Meeting #98, R2-1704477; Hangzhou, China, May 15-19, 2017, 8 pages.
3GPP TS 38.331 V0.0.2 (Mar. 2017), "3rd Generation Partnership Project;Technical Specification Group Radio Access Network; NR; Radio Resource Control (RRC); Protocol specification (Release 15)," Mar. 2017, 13 pages.
Extended European Search Report issued in European Application No. 18794461.6 dated Jan. 24, 2020, 11 pages.
Office Action issued in Chinese Application No. 201710939568.3 dated Apr. 19, 2019, 7 pages (with English translation).
PCT International Search Report and Written Opinion issued in International Application No. PCT/CN2018/085358 dated Jul. 11, 2018, 15 pages (with English translation).
Huawei, "Considerations of NR UL operation for LTE-NR coexistence", 3GPP TSG RAN WG1 Meeting #88bis, R1-1704199, Spokane, USA, Apr. 3-7, 2017, 7 pages.
Huawei, "Considerations of NR UL operation" 3GPP TSG RAN WG1 Meeting #88, R1-1701668, Athens, Greece, Feb. 13-17, 2017, 5 pages.

* cited by examiner

RANDOM ACCESS METHOD, NETWORK DEVICE, AND TERMINAL DEVICE

CROSS-REFERENCE TO RELATED APPLICATIONS

This application is a continuation of International Application No. PCT/CN2018/085358, filed on May 2, 2018, which claims priority to Chinese Patent Application No. 201710939568.3, filed on Sep. 30, 2017 and Chinese Patent Application No. 201710314210.1, filed on May 5, 2017. The disclosures of the aforementioned applications are hereby incorporated by reference in their entireties.

TECHNICAL FIELD

Embodiments of this application relate to the field of communications technologies, and in particular, to a random access method, a network device, and a terminal device.

BACKGROUND

Currently, a long term evolution (LTE) system and a long term evolution advanced (LTE Advanced, LTE-A) system are widely deployed around the world, and will be providing communications services for users for a relatively long time. A new radio access technology (NR) standard of a 5th generation (5G) communications system is being developed, and is expected to be put into commercial use around 2018. Therefore, LTE and NR will coexist for a relatively long period of time in the future. An NR research project also includes technical research of the scenario in which LTE and NR coexist.

When an LTE cell and an NR cell are deployed, the NR cell is deployed in a high-frequency band, and the LTE cell is deployed in a low-frequency band. For example, an important deployment frequency band of the NR cell is 3.5 GHz, and an important deployment frequency band of the LTE cell is 1.8 GHz. NR uses an asymmetric carrier F1 that operates in a time division duplex (TDD) mode, and LTE uses a symmetric carrier F2 that operates in a frequency division duplex (FDD) mode. Current uplink spectrum utilization of LTE is not high, and the 1.8 GHz frequency band provides lower channel fading and better coverage than the 3.5 GHz frequency band does. Therefore, an F2 uplink carrier of LTE may be shared with a 5G NR terminal device (User Equipment, UE), so that both the 5G NR terminal device and LTE UE use the F2 uplink carrier of LTE for uplink transmission, to improve spectrum utilization of the F2 uplink carrier and enhance an uplink coverage capability of 5G NR. However, an F2 downlink carrier of LTE is not necessarily shared with the 5G NR UE. Therefore, the NR UE can perform downlink transmission and receive an NR downlink signal only on an F1 downlink carrier.

UE needs to perform random access to access a radio network system and obtain a communications service. Currently, a random access procedure initiated by one UE may be briefly described as follows: For example, in an operating cell, a synchronization signal is sent and system information is broadcast always periodically on an F1 downlink carrier. The system information includes information required for performing random access on an F1 carrier. The UE starts to search for, in frequency bands, a cell that may provide a service for the UE, and selects a target cell for initial random access. After the UE obtains random access information from an F1 downlink carrier of the target cell, the UE sends a random access request on an F1 uplink carrier to perform random access.

It can be learned from the foregoing random access procedure that the UE can perform random access only on the F1 uplink carrier, but cannot perform random access on the F2 uplink carrier.

SUMMARY

Embodiments of this application provide a random access method, a network device, and a terminal device, so as to implement random access on any uplink carrier.

According to a first aspect, an embodiment of this application provides a random access method. The method includes: receiving, by a terminal device, a system message that is sent by a network device on a first downlink carrier; sending, by the terminal device, a random access request message on a first uplink carrier or on a second uplink carrier; and receiving, by the terminal device, a random access response message that is sent by the network device on the first downlink carrier.

According to the random access method provided in the first aspect, the terminal device receives the system message on the first downlink carrier. The system message carries first information required for performing random access on the first uplink carrier and second information required for performing random access on the second uplink carrier. Therefore, the terminal device can not only initiate random access on the first uplink carrier, but also implement random access on the second uplink carrier because the terminal device can obtain information necessary for initiating random access on the second uplink carrier. A frequency of the second uplink carrier is lower than a frequency of the first uplink carrier. Therefore, random access may be initiated on the second uplink carrier, thereby improving a random access success rate and enhancing uplink coverage performance of the network device.

Optionally, in a possible implementation of the first aspect, the first information includes a center frequency, a bandwidth, and physical random access channel (PRACH) resource configuration information of the first uplink carrier, and the second information includes a center frequency, a bandwidth, and PRACH resource configuration information of the second uplink carrier.

Optionally, in a possible implementation of the first aspect, before the sending, by the terminal device, a random access request message on a first uplink carrier or on a second uplink carrier, the method further includes: determining, by the terminal device, whether to send the random access request message on the first uplink carrier or on the second uplink carrier.

Optionally, in a possible implementation of the first aspect, the determining, by the terminal device, whether to send the random access request message on the first uplink carrier or on the second uplink carrier includes: determining, by the terminal device based on the second information included in the system message, to send the random access request message on the second uplink carrier.

According to the random access method provided in this possible implementation, because the frequency of the first uplink carrier is higher than the frequency of the second uplink carrier, the second uplink carrier usually provides lower channel fading and better uplink coverage than the first uplink carrier does. If the system message includes the second information required for performing random access on the second uplink carrier, the terminal device may directly determine to send the random access request message on the second uplink carrier. A determining process is simple, thereby shortening a random access time and improving a random access success rate.

Optionally, in a possible implementation of the first aspect, the system message further includes access indication information. The determining, by the terminal device, whether to send the random access request message on the first uplink carrier or on the second uplink carrier includes: determining, by the terminal device based on the access indication information included in the system message, to send the random access request message on the second uplink carrier.

According to the random access method provided in this possible implementation, because the frequency of the first uplink carrier is higher than the frequency of the second uplink carrier, the second uplink carrier usually provides lower channel fading and better uplink coverage than the first uplink carrier does. When the second uplink carrier has relatively small load and a relatively low probability that random access request messages collide, the network device may directly instruct the terminal device to send the random access request message on the second uplink carrier. A process is simple, thereby shortening a random access time and improving a random access success rate.

Optionally, in a possible implementation of the first aspect, the second information further includes PRACH power threshold information. The determining, by the terminal device, whether to send the random access request message on the first uplink carrier or on the second uplink carrier includes: determining, by the terminal device based on receive power information of the first downlink carrier and the PRACH power threshold information, whether to send the random access request message on the first uplink carrier or on the second uplink carrier.

According to the random access method provided in this possible implementation, the terminal device can accurately determine, based on the receive power information of the first downlink carrier and the PRACH power threshold information, whether the first uplink carrier or the second uplink carrier meets a random access condition. An uplink carrier with a better signal is selected from the first uplink carrier and the second uplink carrier to send the random access request message, so that a random access success rate can be further improved.

Optionally, in a possible implementation of the first aspect, the receive power information of the first downlink carrier is a reference signal received power of the first downlink carrier. The PRACH power threshold information is a first power threshold for sending, by the terminal device, the random access request message on the first uplink carrier. The determining, by the terminal device based on receive power information of the first downlink carrier and the PRACH power threshold information, whether to send the random access request message on the first uplink carrier or on the second uplink carrier includes: if the reference signal received power of the first downlink carrier is greater than or equal to the first power threshold, determining, by the terminal device, to send the random access request message on the first uplink carrier; or if the reference signal received power of the first downlink carrier is less than the first power threshold, determining, by the terminal device, to send the random access request message on the second uplink carrier.

Optionally, in a possible implementation of the first aspect, the receive power information of the first downlink carrier is a reference signal received power of the first downlink carrier. The PRACH power threshold information is a second power threshold for sending, by the terminal device, the random access request message on the second uplink carrier. The determining, by the terminal device based on the reference signal received power of the first downlink carrier and the PRACH power threshold information, whether to send the random access request message on the first uplink carrier or on the second uplink carrier includes: if the reference signal received power of the first downlink carrier is greater than or equal to the second power threshold, determining, by the terminal device, to send the random access request message on the second uplink carrier; or if the reference signal received power of the first downlink carrier is less than the second power threshold, determining, by the terminal device, to send the random access request message on the first uplink carrier.

Optionally, in a possible implementation of the first aspect, the receive power information of the first downlink carrier is a reference signal received power of the first downlink carrier. The PRACH power threshold information includes a third power threshold for sending, by the terminal device, the random access request message on the second uplink carrier, and includes a path loss offset value between the second uplink carrier and the first uplink carrier. The determining, by the terminal device based on the reference signal received power of the first downlink carrier and the PRACH power threshold information, whether to send the random access request message on the first uplink carrier or on the second uplink carrier includes: if Reference signal received power of the first downlink carrier+Path loss offset value−Third power threshold≥0, determining, by the terminal device, to send the random access request message on the second uplink carrier; or if Reference signal received power of the first downlink carrier+Path loss offset value−Third power threshold<0, determining, by the terminal device, to send the random access request message on the first uplink carrier.

Optionally, in a possible implementation of the first aspect, the second information further includes PRACH power threshold information, and the PRACH power threshold information is third information. The determining, by the terminal device, whether to send the random access request message on the first uplink carrier or on the second uplink carrier includes: determining, by the terminal device based on the third information, to send the random access request message on the second uplink carrier.

Optionally, in a possible implementation of the first aspect, the sending, by the terminal device, a random access request message on a first uplink carrier or on a second uplink carrier includes: sending, by the terminal device, the random access request message to the network device by using a resource that is determined based on the first information and that is on the first uplink carrier, or by using a resource that is determined based on the second information and that is on the second uplink carrier.

Optionally, in a possible implementation of the first aspect, the terminal device sends a radio resource control (RRC) connection request message on the first uplink carrier or on the second uplink carrier.

Optionally, in a possible implementation of the first aspect, the terminal device receives, on the first downlink carrier, an RRC connection configuration message sent by the network device.

According to a second aspect, an embodiment of this application provides a random access method. The method includes: sending, by a network device, a system message to a terminal device on a first downlink carrier; receiving, by the network device on a first uplink carrier or on a second uplink carrier, a random access request message sent by the terminal device; and sending, by the network device, a random access response message to the terminal device on the first downlink carrier.

Optionally, in a possible implementation of the second aspect, first information includes a center frequency, a bandwidth, and PRACH resource configuration information of the first uplink carrier, and second information includes a center frequency, a bandwidth, and PRACH resource configuration information of the second uplink carrier.

Optionally, in a possible implementation of the second aspect, the second information further includes PRACH power threshold information.

Optionally, in a possible implementation of the second aspect, the PRACH power threshold information is third information, and the third information is used to instruct the terminal device to send the random access request message on the second uplink carrier.

Optionally, in a possible implementation of the second aspect, the PRACH power threshold information is a first power threshold that is set by the network device for the terminal device for sending the random access request message on the first uplink carrier.

Optionally, in a possible implementation of the second aspect, the PRACH power threshold information is a second power threshold that is set by the network device for the terminal device for sending the random access request message on the second uplink carrier.

Optionally, in a possible implementation of the second aspect, the PRACH power threshold information includes a third power threshold and a path loss offset value, where the third power threshold is a power threshold that is set by the network device for the terminal device for sending the random access request message on the second uplink carrier, and the path loss offset value is a path loss offset value between the second uplink carrier and the first uplink carrier.

Optionally, in a possible implementation of the second aspect, the system message further includes access indication information, and the access indication information is used to instruct the terminal device to send the random access request message on the second uplink carrier.

According to a third aspect, an embodiment of this application provides a terminal device. The terminal device may include a receiving module and a sending module. The receiving module is configured to receive a system message that is sent by a network device on a first downlink carrier. The sending module is configured to send a random access request message on a first uplink carrier or on a second uplink carrier. The receiving module is further configured to receive a random access response message that is sent by the network device on the first downlink carrier.

Optionally, in a possible implementation of the third aspect, first information includes a center frequency, a bandwidth, and physical random access channel PRACH resource configuration information of the first uplink carrier, and second information includes a center frequency, a bandwidth, and PRACH resource configuration information of the second uplink carrier.

Optionally, in a possible implementation of the third aspect, the terminal device further includes a processing module. The processing module is configured to determine whether to send the random access request message on the first uplink carrier or on the second uplink carrier.

Optionally, in a possible implementation of the third aspect, the processing module is specifically configured to determine, based on the second information included in the system message, to send the random access request message on the second uplink carrier.

Optionally, in a possible implementation of the third aspect, the system message further includes access indication information, and the access indication information is used to instruct the terminal device to send the random access request message on the second uplink carrier; and the processing module is specifically configured to determine, for the terminal device based on the access indication information, to send the random access request message on the second uplink carrier.

Optionally, in a possible implementation of the third aspect, the second information further includes PRACH power threshold information. The processing module is specifically configured to determine, based on receive power information of the first downlink carrier and the PRACH power threshold information, whether to send the random access request message on the first uplink carrier or on the second uplink carrier.

Optionally, in a possible implementation of the third aspect, the receive power information of the first downlink carrier is a reference signal received power of the first downlink carrier. The PRACH power threshold information is a first power threshold for sending, by the terminal device, the random access request message on the first uplink carrier. The processing module is specifically configured to: if the reference signal received power of the first downlink carrier is greater than or equal to the first power threshold, determine to send the random access request message on the first uplink carrier; or if the reference signal received power of the first downlink carrier is less than the first power threshold, determine to send the random access request message on the second uplink carrier.

Optionally, in a possible implementation of the third aspect, the receive power information of the first downlink carrier is a reference signal received power of the first downlink carrier. The PRACH power threshold information is a second power threshold for sending, by the terminal device, the random access request message on the second uplink carrier. The processing module is specifically configured to: if the reference signal received power of the first downlink carrier is greater than or equal to the second power threshold, determine to send the random access request message on the second uplink carrier; or if the reference signal received power of the first downlink carrier is less than the second power threshold, determine to send the random access request message on the first uplink carrier.

Optionally, in a possible implementation of the third aspect, the receive power information of the first downlink carrier is a reference signal received power of the first downlink carrier. The PRACH power threshold information includes a third power threshold for sending, by the terminal device, the random access request message on the second uplink carrier, and includes a path loss offset value between the second uplink carrier and the first uplink carrier. The processing module is specifically configured to: if Reference signal received power of the first downlink carrier+Path loss offset value−Third power threshold≥0, determine to send the random access request message on the second uplink carrier; or if Reference signal received power of the first downlink carrier+Path loss offset value−Third power threshold<0, determine to send the random access request message on the first uplink carrier.

Optionally, in a possible implementation of the third aspect, the second information further includes PRACH power threshold information, the PRACH power threshold information is third information, and the third information is used to instruct the terminal device to send the random access request message on the second uplink carrier; and the processing module is specifically configured to determine, for the terminal device based on the third information, to send the random access request message on the second uplink carrier.

Optionally, in a possible implementation of the third aspect, the sending module is specifically configured to send the random access request message to the network device by using a resource that is determined based on the first information and that is on the first uplink carrier, or by using a resource that is determined based on the second information and that is on the second uplink carrier.

According to a fourth aspect, an embodiment of this application provides a network device. The network device includes a sending module and a receiving module. The sending module is configured to send a system message to a terminal device on a first downlink carrier. The receiving module is configured to receive, on a first uplink carrier or on a second uplink carrier, a random access request message sent by the terminal device. The sending module is further configured to send a random access response message to the terminal device on the first downlink carrier.

Optionally, in a possible implementation of the fourth aspect, first information includes a center frequency, a bandwidth, and physical random access channel PRACH resource configuration information of the first uplink carrier, and second information includes a center frequency, a bandwidth, and PRACH resource configuration information of the second uplink carrier.

Optionally, in a possible implementation of the fourth aspect, the second information further includes PRACH power threshold information.

Optionally, in a possible implementation of the fourth aspect, the PRACH power threshold information is third information, and the third information is used to instruct the terminal device to send the random access request message on the second uplink carrier.

Optionally, in a possible implementation of the fourth aspect, the PRACH power threshold information is a first power threshold that is set by the network device for the terminal device for sending the random access request message on the first uplink carrier.

Optionally, in a possible implementation of the fourth aspect, the PRACH power threshold information is a second power threshold that is set by the network device for the terminal device for sending the random access request message on the second uplink carrier.

Optionally, in a possible implementation of the fourth aspect, the PRACH power threshold information includes a third power threshold and a path loss offset value, where the third power threshold is a power threshold that is set by the network device for the terminal device for sending the random access request message on the second uplink carrier, and the path loss offset value is a path loss offset value between the second uplink carrier and the first uplink carrier.

Optionally, in a possible implementation of the fourth aspect, the system message further includes access indication information, and the access indication information is used to instruct the terminal device to send the random access request message on the second uplink carrier.

According to a fifth aspect, an embodiment of this application provides a terminal device. The terminal device includes a processor, a memory, and a transceiver. The memory is configured to store an instruction. The transceiver is configured to communicate with another device. The processor is configured to execute the instruction stored in the memory, so that the terminal device performs the method according to the first aspect.

According to a sixth aspect, an embodiment of this application provides a network device. The network device includes a processor, a memory, and a transceiver. The memory is configured to store an instruction. The transceiver is configured to communicate with another device. The processor is configured to execute the instruction stored in the memory, so that the terminal device performs the method according to the second aspect.

With reference to the first aspect and the possible implementations of the first aspect, the second aspect and the possible implementations of the second aspect, the third aspect and the possible implementations of the third aspect, the fourth aspect and the possible implementations of the fourth aspect, the fifth aspect and the possible implementations of the fifth aspect, and the sixth aspect and the possible implementations of the sixth aspect, the system message includes the first information required for performing random access on the first uplink carrier and the second information required for performing random access on the second uplink carrier, the frequency of the first uplink carrier is higher than the frequency of the second uplink carrier, and the frequency of the first downlink carrier is the same as the frequency of the first uplink carrier.

According to a seventh aspect, an embodiment of this application provides a program. When being executed by a processor, the program is used to perform the method according to the first aspect.

According to an eighth aspect, an embodiment of this application provides a program product, for example, a computer readable storage medium, including the program according to the seventh aspect.

According to a ninth aspect, an embodiment of this application provides a computer readable storage medium. The computer readable storage medium stores an instruction. When the instruction runs on a computer, the computer is enabled to perform the method according to the first aspect.

According to a tenth aspect, an embodiment of this application provides a program. When being executed by a processor, the program is used to perform the method according to the second aspect.

According to an eleventh aspect, an embodiment of this application provides a program product, for example, a computer readable storage medium, including the program according to the tenth aspect.

According to a twelfth aspect, an embodiment of this application provides a computer readable storage medium. The computer readable storage medium stores an instruction. When the instruction runs on a computer, the computer is enabled to perform the method according to the second aspect.

The embodiments of this application provide the random access method, the network device, and the terminal device. The network device sends the system message to the terminal device on the first downlink carrier, where the system message carries the first information required for performing random access on the first uplink carrier and the second information required for performing random access on the second uplink carrier, so that the terminal device can obtain the second information required for performing random access on the second uplink carrier. In this way, the terminal device can implement random access not only on the first uplink carrier but also on the second uplink carrier. Because the frequency of the second uplink carrier is lower than the frequency of the first uplink carrier, a random access success rate is improved, and uplink coverage performance of the network device is enhanced. In addition, this solution increases flexibility in spectrum division and efficiency in utilization of a fragmented spectrum.

DESCRIPTION OF EMBODIMENTS

Figure 1:
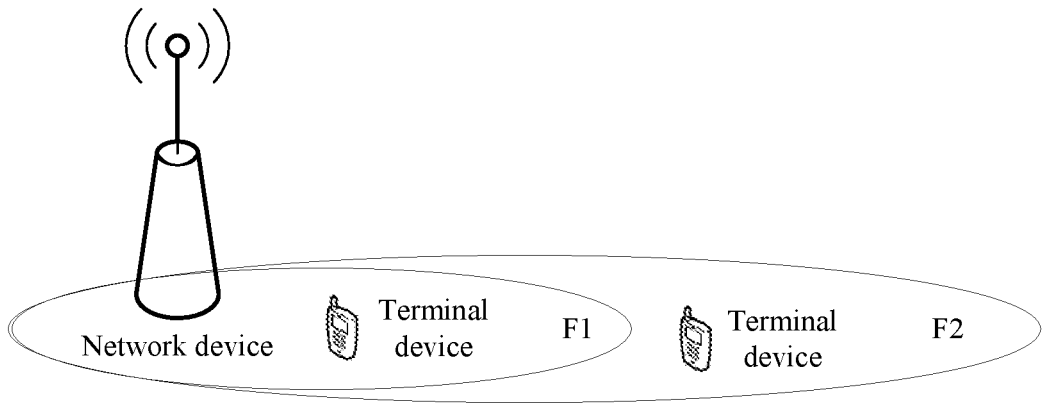
FIG. 1 is an architectural diagram of a network to which embodiments of this application are applied.

A random access method provided in embodiments of this application may be applied to a 5G communications system and another communications system, provided that there is a scenario, in the communications system, in which a quantity of uplink carriers is not equal to a quantity of downlink carriers and the quantity of uplink carriers is greater than the quantity of downlink carriers. FIG. 1 is an architectural diagram of a network to which the embodiments of this application are applied. As shown in FIG. 1, a system includes a network device and terminal devices. The network device has a specific signal coverage area. Within the signal coverage area, an uplink carrier and a downlink carrier are configured for the network device. The terminal device may send data and control signaling to the network device by using a time-frequency resource of an uplink carrier. The network device may send data and control signaling to the terminal device by using a time-frequency resource of a downlink carrier. In FIG. 1, a carrier F2 is an uplink carrier, and a carrier F1 is an uplink carrier and a downlink carrier. A frequency of the carrier F2 is lower than a frequency of the carrier F1. The carrier F2 provides lower channel fading and better coverage. In a scenario in which LTE and NR coexist, the carrier F2 may be a carrier of an LTE frequency band, and the frequency band may be 1.8 GHz, whereas the carrier F1 may be a carrier of an NR frequency band, and the frequency band may be 3.5 GHz.

The random access method provided in the embodiments of this application is intended to resolve a current technical problem in the prior art that when user equipment can use only a low-frequency uplink carrier and high-frequency uplink and downlink carriers, the terminal device cannot perform random access on the low-frequency uplink carrier.

Figure 2:
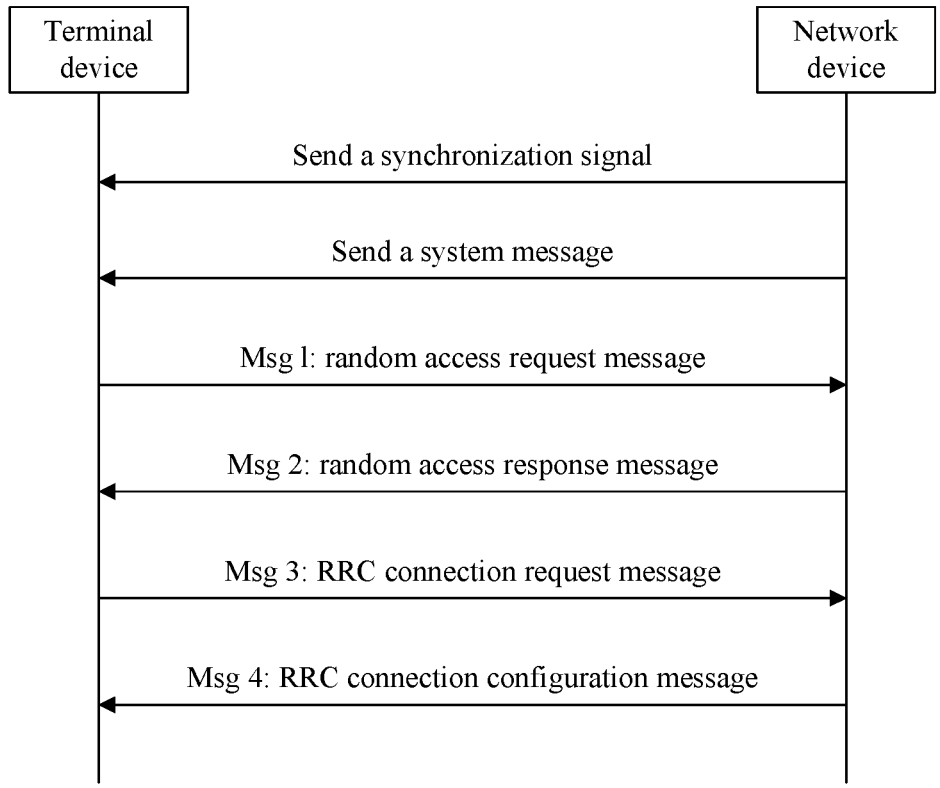
FIG. 2 is a flowchart of an existing random access method.

FIG. 2 is a flowchart of an existing random access method. For a scenario shown in FIG. 1, as shown in FIG. 2, a process of the existing random access method is as follows: Synchronization signal: A network device periodically sends a synchronization signal on F1. The synchronization signal may include a primary synchronization signal (PSS) and a secondary synchronization signal (SSS). By detecting the synchronization signal, a terminal device can learn of an ID of the network device, implement downlink synchronization with the network device, and the like.

System message: The network device periodically broadcasts a downlink system message on F1. The system message may include random access information. The random access information is specifically random access information required for accessing on F1. The system message sent on F1 does not include random access information required for accessing on F2. The random access information may include a random access pilot code sequence number and a configuration index of a transmit physical random access channel (PRACH). Msg 1: The terminal device determines, based on a time-frequency resource configuration of the transmit PRACH in the system message, a resource for sending a random access request on an F1 uplink carrier, and sends a random access request message to the network device. The random access request message may include a resource and a random access sequence that are determined based on the random access pilot code sequence number in the system message. Msg 2: The network device sends a random access response message to the terminal device on an F1 downlink carrier based on the Msg 1. The random access response message may include a timing advance (TA) corresponding to F1. The TA is used by the terminal device for determining a timing relationship of uplink transmission. Msg 3: The terminal device adjusts a TA of the terminal device based on the Msg 2, and sends an RRC connection request message to the network device. Msg 4: The network device sends an RRC connection configuration message to the terminal device, to complete the entire random access process. It can be learned that in the prior art, when user equipment can use only a low-frequency uplink carrier F2 and high-frequency uplink and downlink carriers F1, the terminal device cannot learn of information required for performing random access on the low-frequency F2 uplink carrier, and therefore cannot perform random access on the low-frequency F2 uplink carrier.

According to the random access method provided in the embodiments of this application, random access information of an F1 uplink carrier and random access information of an F2 uplink carrier are carried in a system message that is sent by a network device on an F1 downlink carrier, so that a terminal device can be notified of both the random access information of the F1 uplink carrier and the random access information of the F2 uplink carrier. Therefore, the terminal device can implement random access on the F2 uplink carrier based on the random access information of the F2 uplink carrier.

The terminal device in the embodiments of this application may be a wireless terminal such as a mobile phone or a tablet computer. The wireless terminal includes a device that provides voice and/or data services for a user. The terminal device may be alternatively a handheld device, vehicle-mounted device, wearable device, or computing device with a wireless connection function, or any of various forms of user equipments UEs, mobile stations (MS), or terminals. This is not limited in the embodiments of this application.

The network device in the embodiments of this application may be any device that is capable of managing a radio network resource and that is in a 5G communications system or another communications system. For example, the network device may be a 5G NodeB (gNB) in the 5G communications system or a wireless transceiver device (NeXt Node, NX) in the 5G communications system. This is not limited in the embodiments of this application.

The following describes in detail, by using specific embodiments, technical solutions of this application and how the technical solutions of this application resolve the foregoing technical problem. The following several specific embodiments may be combined, and a same or similar concept or process may not be described repeatedly in some embodiments.

Figure 3:
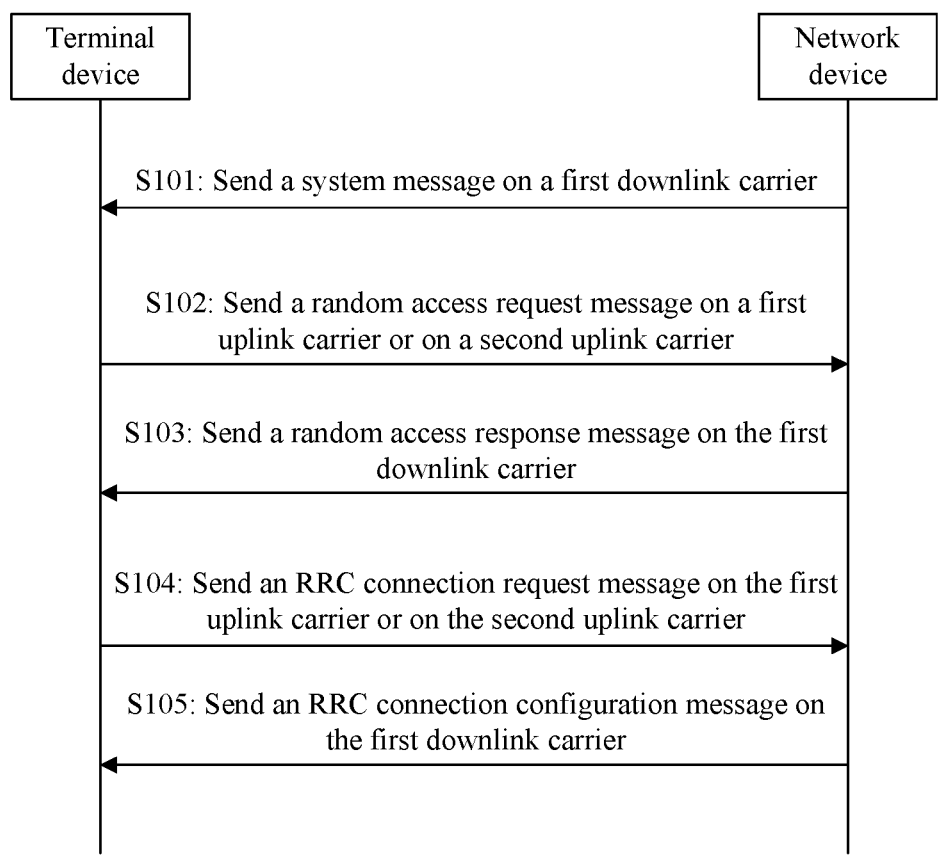
FIG. 3 is a flowchart of a random access method according to an embodiment of this application.

FIG. 3 is a flowchart of a random access method according to an embodiment of this application. As shown in FIG. 3, the random access method provided in this embodiment of this application may include the following steps.

S101: A network device sends a system message to a terminal device on a first downlink carrier.

The system message may include first information required for performing random access on a first uplink carrier and second information required for performing random access on a second uplink carrier, a frequency of the first uplink carrier is higher than a frequency of the second uplink carrier, and a frequency of the first downlink carrier is the same as the frequency of the first uplink carrier.

Correspondingly, the terminal device may receive the system message that is sent by the network device on the first downlink carrier.

Specifically, one downlink carrier and two uplink carriers may be configured for the network device. The one downlink carrier may be referred to as the first downlink carrier. The two uplink carriers may be referred to as the first uplink carrier and the second uplink carrier. The frequency of the first downlink carrier is the same as the frequency of the first uplink carrier, and the frequency of the first uplink carrier is higher than the frequency of the second uplink carrier. Alternatively, with reference to FIG. 1, it may be understood as that two carriers (F1 and F2) may be configured for the network device. One carrier (F1) of the two carriers may be used for uplink information transmission and downlink information transmission, and may be referred to as the first uplink carrier and the first downlink carrier based on transmission directions. The other carrier (F2) is used only for uplink information transmission, and may be referred to as the second uplink carrier. Because the frequency of the second uplink carrier is lower, the second uplink carrier provides lower channel fading and a larger uplink coverage area than the first uplink carrier does.

In this embodiment of this application, the network device sends the system message to the terminal device on the first downlink carrier. The system message not only includes the first information required for performing random access on the first uplink carrier, but also includes the second information required for performing random access on the second uplink carrier. In this way, the network device notifies the terminal device of the random access information of the second uplink carrier, so that the terminal device can initiate random access on the second uplink carrier based on the second information.

The first information includes necessary information that the terminal device needs to obtain when initiating random access on the first uplink carrier. Based on the first information, the terminal device can determine a resource that is on the first uplink carrier. Similarly, the second information includes necessary information that the terminal device needs to obtain when initiating random access on the second uplink carrier. Based on the second information, the terminal device can determine a resource that is on the second uplink carrier.

An implementation of the first information is not limited in this embodiment, and the first information may be existing random access information, of the first uplink carrier, carried in the system message sent on the first downlink carrier. Optionally, the first information may include a center frequency, a bandwidth, and PRACH resource configuration information of the first uplink carrier. Optionally, the PRACH resource configuration information may include a PRACH configuration index.

An implementation of the second information is not limited in this embodiment, and the second information may be similar to the existing random access information, of the first uplink carrier, carried in the system message sent on the first downlink carrier. Optionally, the second information may include a center frequency, a bandwidth, and PRACH resource configuration information of the second uplink carrier. Optionally, the PRACH resource configuration information may include a PRACH configuration index.

Optionally, the system information may further include access indication information. The access indication information is used to instruct the terminal device to send a random access request message on the second uplink carrier.

Optionally, an indication may be made by configuring the access indication information as different values. For example, when the access indication information is configured as "1", it indicates that the network device instructs the terminal device to send the random access request message on the second uplink carrier.

Optionally, an indication may be made by an identity ID, of a target carrier, indicated in the access indication information. For example, when the access indication information indicates an ID of the second uplink carrier, it indicates that the network device instructs the terminal device to send the random access request message on the second uplink carrier.

Optionally, an indication may be made by whether the system message includes the access indication information. For example, when the system information includes the access indication information, it indicates that the network device instructs the terminal device to send the random access request message on the second uplink carrier.

Optionally, the second information may further include PRACH power threshold information. The PRACH power threshold information is set by the network device for the terminal device, and is used by the terminal device to determine whether to initiate random access on the first uplink carrier or on the second uplink carrier.

Optionally, the PRACH power threshold information may be a first power threshold that is set by the network device for the terminal device for sending the random access request message on the first uplink carrier.

Optionally, the PRACH power threshold information may be a second power threshold that is set by the network device for the terminal device for sending the random access request message on the second uplink carrier.

Optionally, the PRACH power threshold information may include a third power threshold and a path loss offset value. The third power threshold may be a power threshold that is set by the network device for the terminal device for sending the random access request message on the second uplink carrier. The path loss offset value may be a path loss offset value between the second uplink carrier and the first uplink carrier.

Optionally, the PRACH power threshold information may be third information. The third information is used to instruct the terminal device to initiate random access on the second uplink carrier. The third information may be directly a piece of indication information, or may be a special value.

Correspondingly, if the PRACH power threshold information is the third information, the terminal device may determine, based on the third information, to initiate random access on the second uplink carrier. If the PRACH power threshold information is not the third information, for example, the PRACH power threshold information is a power threshold, the terminal device may determine, based on the power threshold, an uplink carrier to be selected for initiating random access. The power threshold may be the first power threshold or the second power threshold. Specific implementations of performing determining based on these power thresholds are described in detail later.

It should be noted that specific values of the first power threshold, the second power threshold, the third power threshold, and the path loss offset value are not limited in this embodiment.

Optionally, a value range of the first power threshold may include a value range of a reference signal received power of the terminal device. For example, assuming that the value range of the reference signal received power of the terminal device is [−110 dBm, —60 dBm], the value range of the first power threshold includes [−110 dBm, −60 dBm].

Optionally, the system message may further include common random access information.

Specifically, the first information may be information related to the first uplink carrier when random access is performed on the first uplink carrier, and the second information may be information related to the second uplink carrier when random access is performed on the second uplink carrier, whereas the common random access information may be random access information applicable to both random access on the first uplink carrier and random access on the second uplink carrier. An implementation of the common random access information is not limited in this embodiment. Optionally, the common random access information may include frequency hopping indication information or retransmission indication information.

S102: The terminal device sends the random access request message on the first uplink carrier or on the second uplink carrier.

Correspondingly, the network device may receive, on the first uplink carrier or on the second uplink carrier, the random access request message sent by the terminal device.

Specifically, for a particular terminal device, a random access request message is usually sent on only one uplink carrier. The system message received by the terminal device includes the first information required for performing random access on the first uplink carrier and the second information required for performing random access on the second uplink carrier. Therefore, the terminal device may send the random access request message on the first uplink carrier or on the second uplink carrier. If the terminal device sends the random access request message on the first uplink carrier, correspondingly, the network device may receive, on the first uplink carrier, the random access request message sent by the terminal device. If the terminal device sends the random access request message on the second uplink carrier, correspondingly, the network device may receive, on the second uplink carrier, the random access request message sent by the terminal device.

It should be noted that the network device has a specific signal coverage area, and there may be more than one terminal device that communicates with the network device within the signal coverage area. Therefore, when a plurality of terminal devices communicate with the network device, the network device may receive, on the first uplink carrier and on the second uplink carrier, random access request messages sent by the terminal devices.

Optionally, the sending, by the terminal device, the random access request message on the first uplink carrier or on the second uplink carrier may include:

sending, by the terminal device, the random access request message to the network device by using a resource that is determined based on the first information and that is on the first uplink carrier, or by using a resource that is determined based on the second information and that is on the second uplink carrier.

How the terminal device determines the resource on the first uplink carrier based on the first information and how the terminal device determines the resource on the second uplink carrier based on the second information are not particularly limited in this embodiment. Any resource determining method in an existing random access process may be used.

Optionally, if the first information includes the center frequency, the bandwidth, and the PRACH configuration index of the first uplink carrier, the terminal device may determine, based on the PRACH configuration index and on a time-frequency resource that is limited by the center frequency of the first uplink carrier and the bandwidth of the first uplink carrier, a resource for sending the random access request message.

Optionally, if the second information includes the center frequency, the bandwidth, and the PRACH configuration index of the second uplink carrier, the terminal device may determine, based on the PRACH configuration index and on a time-frequency resource that is limited by the center frequency of the second uplink carrier and the bandwidth of the second uplink carrier, a resource for sending the random access request message.

Specific information included in the random access request message is not particularly limited in this embodiment, and may be the same as information included in an existing random access request message. Optionally, the random access request message may include a random access sequence.

S103: The network device sends a random access response message to the terminal device on the first downlink carrier.

Correspondingly, the terminal device may receive the random access response message that is sent by the network device on the first downlink carrier.

Specific information included in the random access response message is not particularly limited in this embodiment, and may be the same as information included in an existing random access response message. Optionally, the random access response message may include a TA. It should be noted that if the terminal device sends the random access request message on the first uplink carrier, the TA is corresponding to the first uplink carrier, or if the terminal device sends the random access request message on the second uplink carrier, the TA is corresponding to the second uplink carrier.

It can be learned that according to the random access method provided in this embodiment of this application, in a scenario in which a quantity of uplink carriers is not equal to a quantity of downlink carriers and the quantity of uplink carriers is greater than the quantity of downlink carriers, the network device sends the system message to the terminal device on the first downlink carrier, where the first information required for performing random access on the first uplink carrier and the second information required for performing random access on the second uplink carrier are carried in the system message, so that the random access information of the two uplink carriers can be sent to the terminal device. In this way, the terminal device can obtain information necessary for initiating random access on the second uplink carrier, and implement random access on the second uplink carrier. The frequency of the second uplink carrier is lower than the frequency of the first uplink carrier. Therefore, random access may be initiated on the second uplink carrier, thereby improving a random access success rate and enhancing uplink coverage performance of the network device.

Optionally, the random access method provided in this embodiment may further include the following steps.

S104: The terminal device sends an RRC connection request message on the first uplink carrier or on the second uplink carrier.

Correspondingly, the network device receives, on the first uplink carrier or on the second uplink carrier, the RRC connection request message sent by the terminal device.

Specifically, for a particular terminal device, the terminal device may send an RRC connection request message on the first uplink carrier or on the second uplink carrier. It should be noted that when a plurality of terminal devices communicate with the network device, the network device may receive, on the first uplink carrier and on the second uplink carrier, RRC connection request messages sent by the terminal devices.

S105: The network device sends an RRC connection configuration message to the terminal device on the first downlink carrier.

Correspondingly, the terminal device may receive the RRC connection configuration message that is sent by the network device on the first downlink carrier.

It should be noted that specific information included in the RRC connection request message and the RRC connection configuration message is not limited in this embodiment, and may be the same as RRC messages in an existing access procedure.

Further, before S102 in which the terminal device sends the random access request message on the first uplink carrier or on the second uplink carrier, the method may further include:

determining, by the terminal device, whether to send the random access request message on the first uplink carrier or on the second uplink carrier.

Optionally, in a specific implementation, the determining, by the terminal device, whether to send the random access request message on the first uplink carrier or on the second uplink carrier may include:

determining, by the terminal device based on the second information included in the system message, to send the random access request message on the second uplink carrier.

Specifically, because the frequency of the first uplink carrier is higher than the frequency of the second uplink carrier, the second uplink carrier usually provides lower channel fading and better uplink coverage than the first uplink carrier does. A coverage area of the second uplink carrier is greater than a coverage area of the first uplink carrier. At a particular location within the signal coverage area of the network device, a power of the second uplink carrier is usually greater than a power of the first uplink carrier. Therefore, if the system message includes the second information required for performing random access on the second uplink carrier, the terminal device may directly determine to send the random access request message on the second uplink carrier. A determining process is simple, thereby shortening a random access time and improving a random access success rate.

Optionally, in another specific implementation, if the system information further includes the access indication information, the determining, by the terminal device, whether to send the random access request message on the first uplink carrier or on the second uplink carrier may include:

determining, by the terminal device based on the access indication information, to send the random access request message on the second uplink carrier.

Specifically, because the frequency of the first uplink carrier is higher than the frequency of the second uplink carrier, the second uplink carrier usually provides lower channel fading and better uplink coverage than the first uplink carrier does. A coverage area of the second uplink carrier is greater than a coverage area of the first uplink carrier. When the second uplink carrier has relatively small load and a relatively low probability that random access request messages collide, the network device may directly instruct, by using the access indication information, the terminal device to send the random access request message on the second uplink carrier. Correspondingly, the terminal device directly determines, based on the access indication information, to send the random access request message on the second uplink carrier. A determining process is simple, thereby shortening a random access time and improving a random access success rate.

Optionally, in another specific implementation, if the second information further includes the PRACH power threshold information, the determining, by the terminal device, whether to send the random access request message on the first uplink carrier or on the second uplink carrier may include:

determining, by the terminal device based on receive power information of the first downlink carrier and the PRACH power threshold information, whether to send the random access request message on the first uplink carrier or on the second uplink carrier.

Specifically, in a communication process, when a frequency of an uplink carrier is the same as a frequency of a downlink carrier, there is a specific correspondence between uplink power attenuation and downlink power attenuation, and power attenuation in one transmission direction can reflect power attenuation in the other transmission direction. The receive power information of the first downlink carrier is an actual downlink power value obtained by the terminal device through measurement, and reflects power attenuation of the first downlink carrier. The terminal device may obtain power attenuation of the first uplink carrier with reference to the receive power information of the first downlink carrier. An implementation of the receive power information of the first downlink carrier is not limited in this embodiment. Optionally, the receive power information of the first downlink carrier may be a reference signal received power (RSRP), or may be reference signal received quality (RSRQ). The PRACH power threshold information reflects a minimum power condition that needs to be met in a random access process. Therefore, whether the first uplink carrier or the second uplink carrier meets a random access condition may be determined based on the receive power information of the first downlink carrier and the PRACH power threshold information. In this way, a better uplink carrier is selected from the first uplink carrier and the second uplink carrier to send the random access request message, so that a random access success rate can be further improved.

Optionally, in a first implementation, if the receive power information of the first downlink carrier is the reference signal received power of the first downlink carrier, and the PRACH power threshold information is the first power threshold for sending, by the terminal device, the random access request message on the first uplink carrier, the determining, by the terminal device based on receive power information of the first downlink carrier and the PRACH power threshold information, whether to send the random access request message on the first uplink carrier or on the second uplink carrier may include:

if the reference signal received power of the first downlink carrier is greater than or equal to the first power threshold, determining, by the terminal device, to send the random access request message on the first uplink carrier; or if the reference signal received power of the first downlink carrier is less than the first power threshold, determining, by the terminal device, to send the random access request message on the second uplink carrier.

Specifically, the first power threshold is configured by the network device. A manner of configuring the first power threshold is not limited in this embodiment. Optionally, the first power threshold may reflect a lowest power requirement that needs to be met for sending the random access request message on the first uplink carrier. If the reference signal received power of the first downlink carrier is greater than or equal to the first power threshold, it indicates that the first uplink carrier can meet the random access condition, and the terminal device may send the random access request message on the first uplink carrier, and does not need to send the random access request message on the second uplink carrier with a higher power level. If the reference signal received power of the first downlink carrier is less than the first power threshold, it indicates that the first uplink carrier cannot meet the random access condition, and the terminal device may send the random access request message on the second uplink carrier with a higher power level.

Optionally, the first power threshold may be set to be always greater than the reference signal received power of the terminal device. For example, the first power threshold may be positive infinity, or may be any value that is greater than a maximum value of the reference signal received power of the terminal device.

Optionally, in a second implementation, if the receive power information of the first downlink carrier is the reference signal received power of the first downlink carrier, and the PRACH power threshold information is the second power threshold for sending, by the terminal device, the random access request message on the second uplink carrier, the determining, by the terminal device based on the reference signal received power of the first downlink carrier and the PRACH power threshold information, whether to send the random access request message on the first uplink carrier or on the second uplink carrier may include:

if the reference signal received power of the first downlink carrier is greater than or equal to the second power threshold, determining, by the terminal device, to send the random access request message on the second uplink carrier; or if the reference signal received power of the first downlink carrier is less than the second power threshold, determining, by the terminal device, to send the random access request message on the first uplink carrier.

Specifically, the second power threshold is configured by the network device. A manner of configuring the second power threshold is not limited in this embodiment. Optionally, the second power threshold may reflect a lowest power requirement that needs to be met for sending the random access request message on the second uplink carrier, a path loss offset value, and a selection tendency of the network device for a random access carrier. If the reference signal received power of the first downlink carrier is greater than or equal to the second power threshold, the terminal device may send the random access request message on the second uplink carrier. If the reference signal received power of the first downlink carrier is less than the second power threshold, the terminal device may send the random access request message on the first uplink carrier.

Optionally, in a third implementation, if the receive power information of the first downlink carrier is the reference signal received power of the first downlink carrier, and the PRACH power threshold information includes the third power threshold for sending, by the terminal device, the random access request message on the second uplink carrier, and includes the path loss offset value between the second uplink carrier and the first uplink carrier, the determining, by the terminal device based on the reference signal received power of the first downlink carrier and the PRACH power threshold information, whether to send the random access request message on the first uplink carrier or on the second uplink carrier may include:

if Reference signal received power of the first downlink carrier+Path loss offset value−Third power threshold≥0, determining, by the terminal device, to send the random access request message on the second uplink carrier; or if Reference signal received power of the first downlink carrier+Path loss offset value−Third power threshold<0, determining, by the terminal device, to send the random access request message on the first uplink carrier.

Specifically, the third power threshold is configured by the network device. A manner of configuring the third power threshold is not limited in this embodiment. Optionally, the third power threshold may reflect a lowest power requirement that needs to be met for sending the random access request message on the second uplink carrier, and a selection tendency of the network device for a random access carrier. The path loss offset value between the second uplink carrier and the first uplink carrier is a difference between a path loss value of the second uplink carrier and a path loss value of the first uplink carrier. Manners of measuring and configuring the path loss offset value are not limited in this embodiment. If a sum of the reference signal received power of the first downlink carrier and the path loss offset value is greater than or equal to the third power threshold, the terminal device may send the random access request message on the second uplink carrier. If a sum of the reference signal received power of the first downlink carrier and the path loss offset value is less than the third power threshold, the terminal device may send the random access request message on the first uplink carrier.

Optionally, in another implementation, if the second information further includes the PRACH power threshold information, and the PRACH power threshold information is the third information, the determining, by the terminal device, whether to send the random access request message on the first uplink carrier or on the second uplink carrier may include:

determining, by the terminal device based on the third information, to send the random access request message on the second uplink carrier.

Specifically, the third information may be used as a piece of indication information. The indication information instructs the terminal device to determine, without determining whether the reference signal received power of the first downlink carrier is greater than or equal to any power threshold, to send the random access request message on the second uplink carrier. A determining process is simple, thereby shortening a random access time and improving a random access success rate.

This embodiment of this application provides the random access method, including: sending, by the network device, the system message to the terminal device on the first downlink carrier, where the system message includes the first information required for performing random access on the first uplink carrier and the second information required for performing random access on the second uplink carrier, the frequency of the first uplink carrier is higher than the frequency of the second uplink carrier, and the frequency of the first downlink carrier is the same as the frequency of the first uplink carrier; sending, by the terminal device, the random access request message on the first uplink carrier or on the second uplink carrier; and sending, by the network device, the random access response message to the terminal device on the first downlink carrier. According to the random access method provided in this embodiment of this application, in a scenario in which a quantity of uplink carriers is not equal to a quantity of downlink carriers and the quantity of uplink carriers is greater than the quantity of downlink carriers, the terminal device can implement the random access process on any uplink carrier, thereby improving the random access success rate and enhancing the uplink coverage performance of the network device.

Figure 4:
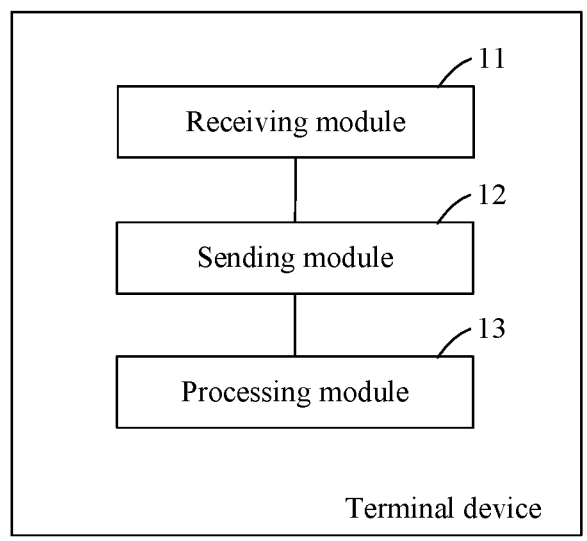
FIG. 4 is a schematic structural diagram of a terminal device according to Embodiment 1 of this application.

FIG. 4 is a schematic structural diagram of a terminal device according to Embodiment 1 of this application. The terminal device provided in this embodiment of this application is configured to perform operations performed by the terminal device in the random access method provided in the embodiment shown in FIG. 3. As shown in FIG. 4, the terminal device provided in this embodiment of this application may include:

a receiving module 11, configured to receive a system message that is sent by a network device on a first downlink carrier, where the system message includes first information required for performing random access on a first uplink carrier and second information required for performing random access on a second uplink carrier, a frequency of the first uplink carrier is higher than a frequency of the second uplink carrier, and a frequency of the first downlink carrier is the same as the frequency of the first uplink carrier; and a sending module 12, configured to send a random access request message on the first uplink carrier or on the second uplink carrier.

The receiving module 11 is further configured to receive a random access response message that is sent by the network device on the first downlink carrier.

Optionally, the first information includes a center frequency, a bandwidth, and PRACH resource configuration information of the first uplink carrier; and the second information includes a center frequency, a bandwidth, and PRACH resource configuration information of the second uplink carrier.

Optionally, a processing module 13 is further included, and the processing module 13 is configured to:

determine whether to send the random access request message on the first uplink carrier or on the second uplink carrier.

Optionally, the processing module 13 is specifically configured to:

determine, based on the second information included in the system message, to send the random access request message on the second uplink carrier.

Optionally, the system message further includes access indication information, and the access indication information is used to instruct the terminal device to send the random access request message on the second uplink carrier; and the processing module 13 is specifically configured to:

determine, for the terminal device based on the access indication information, to send the random access request message on the second uplink carrier.

Optionally, the second information further includes PRACH power threshold information; and the processing module 13 is specifically configured to:

determine, based on receive power information of the first downlink carrier and the PRACH power threshold information, whether to send the random access request message on the first uplink carrier or on the second uplink carrier.

Optionally, the receive power information of the first downlink carrier is a reference signal received power of the first downlink carrier;

the PRACH power threshold information is a first power threshold for sending, by the terminal device, the random access request message on the first uplink carrier; and the processing module 13 is specifically configured to:

if the reference signal received power of the first downlink carrier is greater than or equal to the first power threshold, determine to send the random access request message on the first uplink carrier; or if the reference signal received power of the first downlink carrier is less than the first power threshold, determine to send the random access request message on the second uplink carrier.

Optionally, the receive power information of the first downlink carrier is a reference signal received power of the first downlink carrier;

the PRACH power threshold information is a second power threshold for sending, by the terminal device, the random access request message on the second uplink carrier; and the processing module 13 is specifically configured to:

if the reference signal received power of the first downlink carrier is greater than or equal to the second power threshold, determine to send the random access request message on the second uplink carrier; or if the reference signal received power of the first downlink carrier is less than the second power threshold, determine to send the random access request message on the first uplink carrier.

Optionally, the receive power information of the first downlink carrier is a reference signal received power of the first downlink carrier;

the PRACH power threshold information includes a third power threshold for sending, by the terminal device, the random access request message on the second uplink carrier, and includes a path loss offset value between the second uplink carrier and the first uplink carrier; and the processing module 13 is specifically configured to:

if Reference signal received power of the first downlink carrier+Path loss offset value−Third power threshold≥0, determine to send the random access request message on the second uplink carrier; or if Reference signal received power of the first downlink carrier+Path loss offset value−Third power threshold<0, determine to send the random access request message on the first uplink carrier.

Optionally, the PRACH power threshold information is third information, and the third information is used to instruct the terminal device to send the random access request message on the second uplink carrier; and the processing module 13 is specifically configured to:
determine, for the terminal device based on the third information, to send the random access request message on the second uplink carrier.

Optionally, the sending module 12 is specifically configured to:
send the random access request message to the network device by using a resource that is determined based on the first information and that is on the first uplink carrier, or by using a resource that is determined based on the second information and that is on the second uplink carrier.

The terminal device provided in this embodiment of this application is configured to perform the operations performed by the terminal device in the method embodiment shown in FIG. 3. Technical principles and technical effects thereof are similar, and details are not described herein again.

Figure 5:
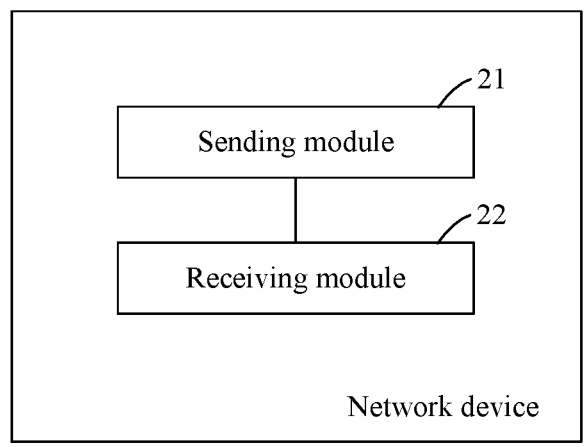
FIG. 5 is a schematic structural diagram of a network device according to Embodiment 1 of this application.

FIG. 5 is a schematic structural diagram of a network device according to Embodiment 1 of this application. The network device provided in this embodiment of this application is configured to perform operations performed by the network device in the random access method provided in the embodiment shown in FIG. 3. As shown in FIG. 5, the network device provided in this embodiment of this application may include:

a sending module 21, configured to send a system message to a terminal device on a first downlink carrier, where the system message includes first information required for performing random access on a first uplink carrier and second information required for performing random access on a second uplink carrier, a frequency of the first uplink carrier is higher than a frequency of the second uplink carrier, and a frequency of the first downlink carrier is the same as the frequency of the first uplink carrier; and a receiving module 22, configured to receive, on the first uplink carrier or on the second uplink carrier, a random access request message sent by the terminal device.

The sending module 21 is further configured to send a random access response message to the terminal device on the first downlink carrier.

Optionally, the first information includes a center frequency, a bandwidth, and physical random access channel PRACH resource configuration information of the first uplink carrier; and the second information includes a center frequency, a bandwidth, and PRACH resource configuration information of the second uplink carrier.

Optionally, the second information further includes PRACH power threshold information.

Optionally, the PRACH power threshold information is third information, and the third information is used to instruct the terminal device to send the random access request message on the second uplink carrier.

Optionally, the PRACH power threshold information is a first power threshold that is set by the network device for the terminal device for sending the random access request message on the first uplink carrier.

Optionally, the PRACH power threshold information is a second power threshold that is set by the network device for the terminal device for sending the random access request message on the second uplink carrier.

Optionally, the PRACH power threshold information includes a third power threshold and a path loss offset value, where the third power threshold is a power threshold that is set by the network device for the terminal device for sending the random access request message on the second uplink carrier, and the path loss offset value is a path loss offset value between the second uplink carrier and the first uplink carrier.

Optionally, the system message further includes access indication information, and the access indication information is used to instruct the terminal device to send the random access request message on the second uplink carrier.

The network device provided in this embodiment of this application is configured to perform the operations performed by the network device in the method embodiment shown in FIG. 3. Technical principles and technical effects thereof are similar, and details are not described herein again.

Figure 6:
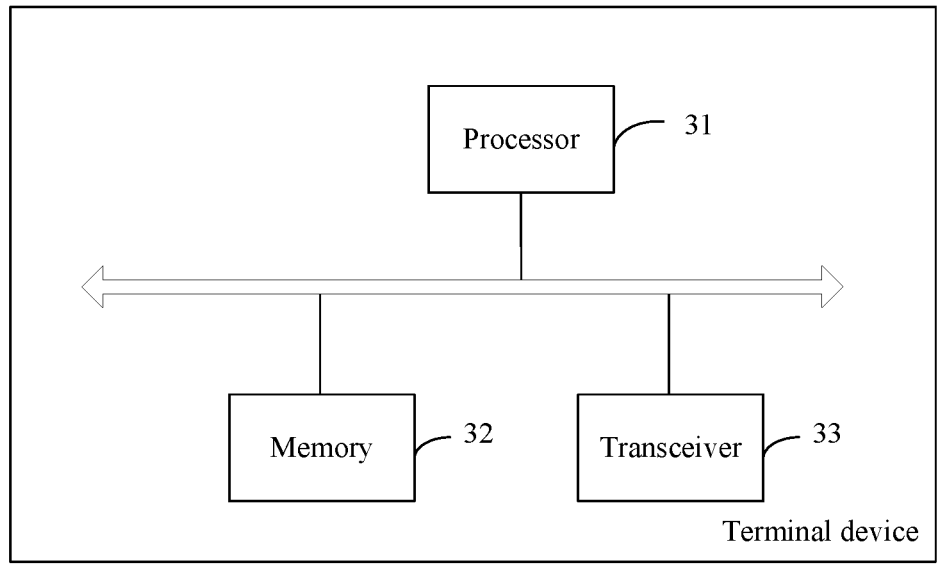
FIG. 6 is a schematic structural diagram of a terminal device according to Embodiment 2 of this application.

FIG. 6 is a schematic structural diagram of a terminal device according to Embodiment 2 of this application. As shown in FIG. 6, the terminal device includes a processor 31, a memory 32, and a transceiver 33. The memory 32 is configured to store an instruction. The transceiver 33 is configured to communicate with another device. The processor 31 is configured to execute the instruction stored in the memory 32, so that the terminal device performs operations performed by the terminal device in the embodiment shown in FIG. 3. Specific implementations and technical effects are similar, and details are not described herein again.

Figure 7:
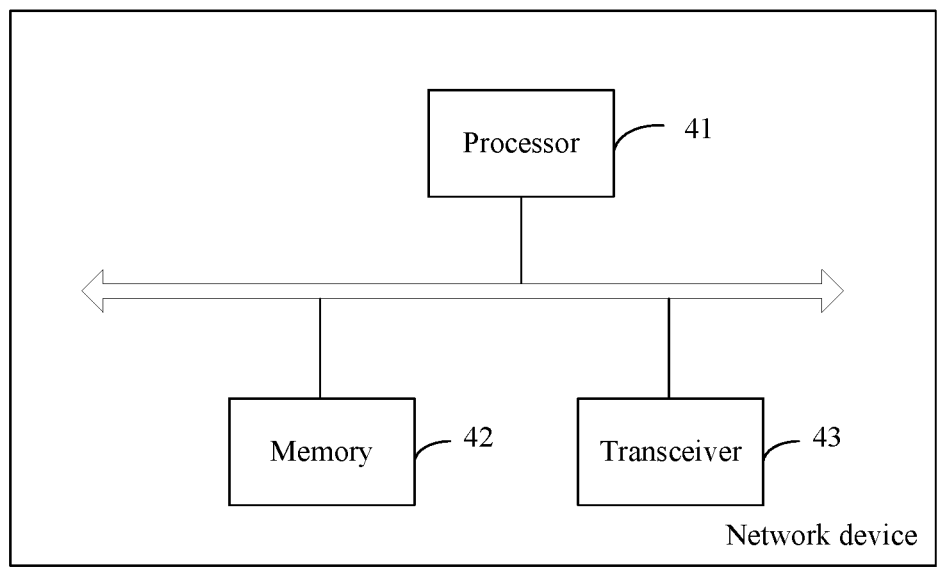
FIG. 7 is a schematic structural diagram of a network device according to Embodiment 2 of this application.

FIG. 7 is a schematic structural diagram of a network device according to Embodiment 2 of this application. As shown in FIG. 7, the network device includes a processor 41, a memory 42, and a transceiver 43. The memory 42 is configured to store an instruction. The transceiver 43 is configured to communicate with another device. The processor 41 is configured to execute the instruction stored in the memory 42, so that the network device performs operations performed by the network device in the embodiment shown in FIG. 3. Specific implementations and technical effects are similar, and details are not described herein again.

It may be understood that the processor used by the network device or the terminal device in this application may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in this application. Alternatively, the processor may be a combination implementing a computing function, for example, a combination including one or more microprocessors, or a combination of a DSP and a microprocessor.

Persons of ordinary skill in the art may understand that all or some of the steps of the method embodiments may be implemented by a program instructing related hardware. The program may be stored in a computer readable storage medium. When the program runs, the steps of the method embodiments are performed. The foregoing storage medium includes any medium that can store program code, such as a ROM, a RAM, a magnetic disk, or a compact disc.

Finally, it should be noted that the foregoing embodiments are merely intended for describing the technical solutions in the embodiments of this application, instead of limiting the technical solutions. Although the embodiments of this application are described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions in the embodiments of this application.

What is claimed is:

1. A random access method, the method comprising:
receiving, by a terminal device, a system message from a network device on a first downlink carrier, wherein the system message comprises first information for performing random access on a first uplink carrier and second information for performing random access on a second uplink carrier, wherein the second information further comprises a first Physical Random Access Channel (PRACH) power threshold, and wherein a frequency of the first uplink carrier is higher than a frequency of the second uplink carrier;
determining, by the terminal device based on a reference signal received power of the first downlink carrier and the first PRACH power threshold, an uplink carrier for sending a random access request message, wherein:
when the reference signal received power of the first downlink carrier is greater than or equal to the first PRACH power threshold, the uplink carrier for sending the random access request message is the first uplink carrier; and
when the reference signal received power of the first downlink carrier is less than the first PRACH power threshold, the uplink carrier for sending the random access request message is the second uplink carrier;
sending, by the terminal device, the random access request message on the uplink carrier for sending the random access request message; and
receiving, by the terminal device, a random access response message from the network device on the first downlink carrier.

2. The method according to claim 1, wherein:
the first information comprises a center frequency, a bandwidth, and physical random access channel (PRACH) resource configuration information of the first uplink carrier; and
the second information comprises a center frequency, a bandwidth, and PRACH resource configuration information of the second uplink carrier.

3. The method according to claim 1, wherein before the sending, by the terminal device, a random access request message on the first uplink carrier or on the second uplink carrier, the method further comprises:
determining, by the terminal device, whether to send the random access request message on the first uplink carrier or on the second uplink carrier.

4. The method according to claim 3, wherein the determining, by the terminal device, whether to send the random access request message on the first uplink carrier or on the second uplink carrier comprises:
determining, by the terminal device and based on the second information comprised in the system message, sending the random access request message on the second uplink carrier.

5. The method according to claim 3, wherein the system message further comprises access indication information, and wherein the access indication information is used to instruct the terminal device to send the random access request message on the second uplink carrier; and
wherein the determining, by the terminal device, whether to send the random access request message on the first uplink carrier or on the second uplink carrier comprises:
determining, by the terminal device and based on the access indication information, sending the random access request message on the second uplink carrier.

6. The method according to claim 3, wherein the second information further comprises PRACH power threshold information, wherein the PRACH power threshold information is third information, and wherein the third information is used to instruct the terminal device to send the random access request message on the second uplink carrier; and
wherein the determining, by the terminal device, whether to send the random access request message on the first uplink carrier or on the second uplink carrier comprises:
determining, by the terminal device and based on the third information, sending the random access request message on the second uplink carrier.

7. The method according to claim 1, wherein the sending, by the terminal device, a random access request message on the first uplink carrier or on the second uplink carrier comprises:
sending, by the terminal device, the random access request message to the network device by using a resource that is determined based on the first information and that is on the first uplink carrier, or by using a resource that is determined based on the second information and that is on the second uplink carrier.

8. The method according to claim 1, wherein a frequency of the first downlink carrier is the same as the frequency of the first uplink carrier.

9. The method according to claim 1, wherein a value range of the first PRACH power threshold is same as a value range of the reference signal received power of the terminal device.

10. The method according to claim 1, further comprising:
sending, by the terminal device, a radio resource control (RRC) connection request message on the uplink carrier for sending the random access request message.

11. A terminal device, the terminal device comprising:
at least one processor; and
a memory storing instructions executable by the at least one processor, the instructions instructing the at least one processor to:
receive a system message from a network device on a first downlink carrier, wherein the system message comprises first information for performing random access on a first uplink carrier and second information for performing random access on a second uplink carrier, wherein the second information further comprises a first Physical Random Access Channel (PRACH) power threshold, and wherein a frequency of the first uplink carrier is higher than a frequency of the second uplink carrier;
determine, based on a reference signal received power of the first downlink carrier and the first PRACH power threshold, an uplink carrier for sending a random access request message, wherein:
when the reference signal received power of the first downlink carrier is greater than or equal to the first PRACH power threshold, the uplink carrier for sending the random access request message is the first uplink carrier; and
when the reference signal received power of the first downlink carrier is less than the first PRACH power threshold, the uplink carrier for sending the random access request message is the second uplink carrier;

send the random access request message on the uplink carrier for sending the random access request message; and receive a random access response message from the network device on the first downlink carrier.

12. The terminal device according to claim 11, wherein:
the first information comprises a center frequency, a bandwidth, and physical random access channel (PRACH) resource configuration information of the first uplink carrier; and
the second information comprises a center frequency, a bandwidth, and PRACH resource configuration information of the second uplink carrier.

13. The terminal device according to claim 11, wherein the instructions further instruct the at least one processor to:
determine whether to send the random access request message on the first uplink carrier or on the second uplink carrier.

14. The terminal device according to claim 13, wherein the instructions further instruct the at least one processor to:
determine, based on the second information comprised in the system message, sending the random access request message on the second uplink carrier.

15. The terminal device according to claim 11, wherein the instructions further instruct the at least one processor to:
send the random access request message to the network device by using a resource that is determined based on the first information and that is on the first uplink carrier, or by using a resource that is determined based on the second information and that is on the second uplink carrier.

* * * * *